July 1, 1930.  W. R. GILLAM  1,769,219
RIM
Filed July 8, 1925
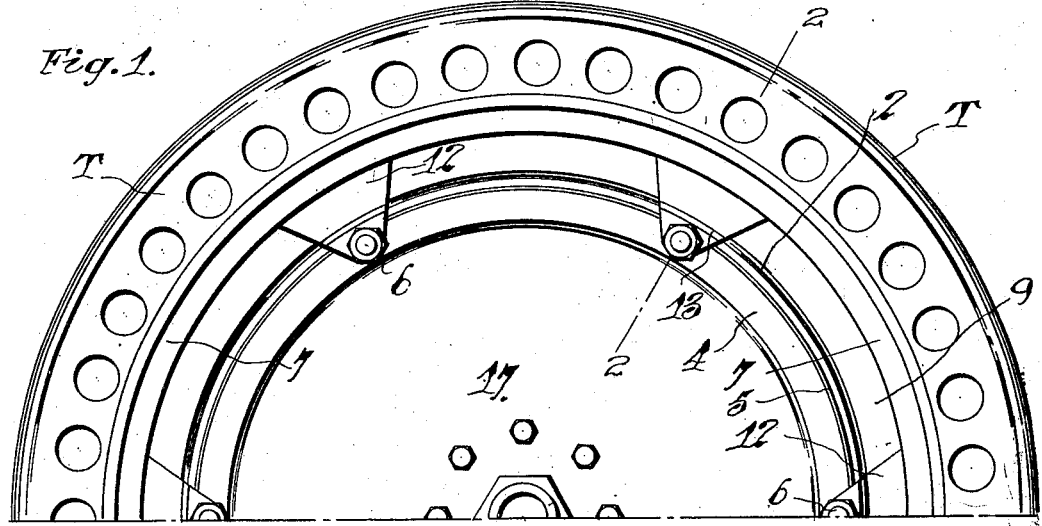
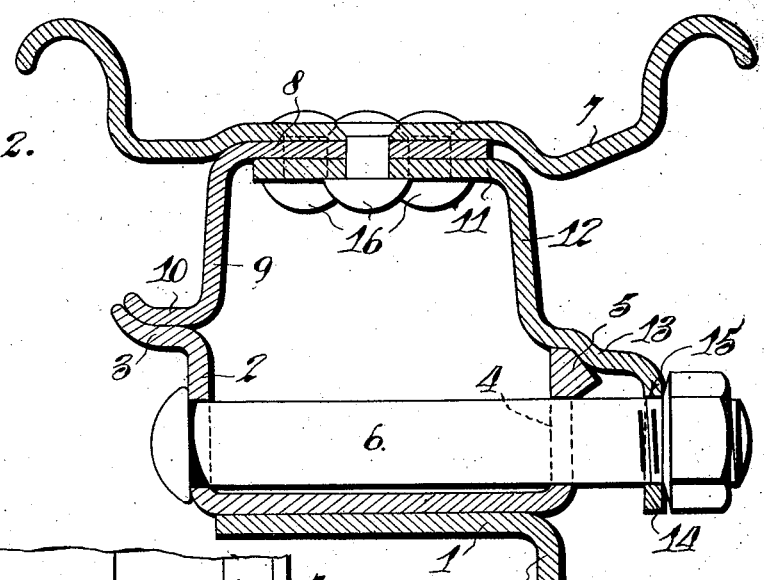
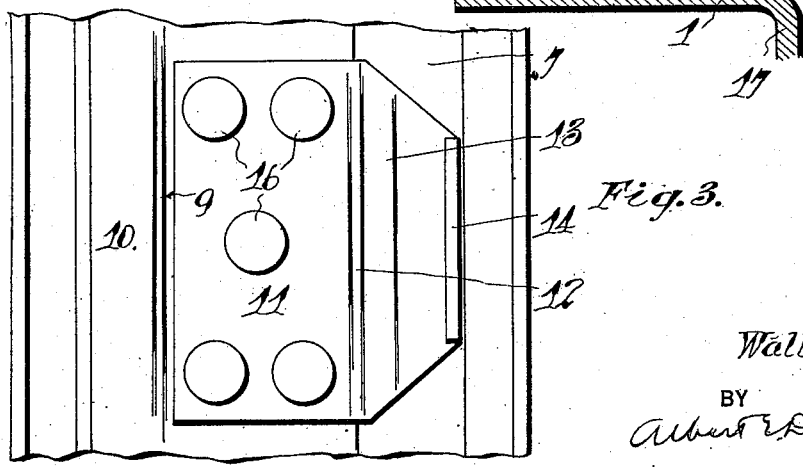
INVENTOR
Wallace R. Gillam
BY
ATTORNEY.

Patented July 1, 1930

1,769,219

UNITED STATES PATENT OFFICE

WALLACE R. GILLAM, OF TALLMADGE, OHIO, ASSIGNOR TO LAMBERT TIRE & RUBBER CO., OF BARBERTON, OHIO, A CORPORATION OF ARIZONA

RIM

Application filed July 8, 1925. Serial No. 42,231.

My present invention relates to certain new and useful improvements in rim structures for mounting tires on wheels, and the invention specifically has for its object to provide an improved means for mounting a cushion tire of a smaller cross sectional size in place of a balloon type tire of larger cross sectional size without the necessity of changing the wheels or felloe bands.

More specifically the present invention is an improvement or modification of the invention disclosed in my co-pending application filed January 30, 1925, Serial No. 5,868.

The present invention particularly has for its object to provide a structure that is especially adapted for use in the larger sizes of tires and wheels and it has for its particular purpose the reduction of the expense of manufacture and the reduction of the weight of the structure as much as possible consistent with safety.

In carrying out my present invention I provide a rim unit composed of two parts, one of which constitutes the rim proper that receives the tire, while the other constitutes a filler rim, the filler rim occupying the space between the rim proper and the felloe band of the wheel on which it is to be used; the filler rim in the present embodiment of the invention is composed of an annular channel, L-shaped in cross section, ring having a portion to bear on the felloe band and another portion to lie flat against the underside of the rim proper. It also embodies a series of lugs or securing and spacing members of similarly L-shape in cross section, one part of which is secured beneath the ring or band that is in turn secured to the rim proper, and the other portion of which has surfaces to bear on the felloe band and has apertured ears to receive the securing bolts by which the rim is held on the felloe band.

In its more detail nature the invention resides in those novel features of construction, combination and arrangement of parts, all of which will be first fully described, then be specifically pointed out in the appended claims, reference being had to the accompanying drawing, in which:—

Figure 1 is a side elevation of one half of a wheel and rim embodying my invention.

Figure 2 is a cross section on the line 2—2 of Figure 1.

Figure 3 is an inverted plan view of a portion of the structure constituting my present invention.

In the drawing, in which like numerals and letters of reference indicate like parts in all the figures, 1 represents the felloe band of the wheel which, in the present case, is of the standard type such as is used to carry the demountable rims on which the balloon tires are carried. The felloe band (or fixed rim which is adapted to receive the demountable rim of a pneumatic tire) consists of an annular body having side flanges 2 and 4, the former having a rim seat 3 and the latter a rim seat 5.

7 designates the rim proper which is designed to carry the tire, in this case a cushion tire T mounted on the rim. The rim proper 7 is of the usual and conventional form but is of greater diameter than the diameter of the rim (not shown) which carries a balloon tire and is adapted to fit onto the felloe band.

8 designates the annular filler rim member which is formed as a continuous ring secured to the underside of the rim 7 by rivets 16 and having a side wall 9 and a flange 10, the latter being adapted to seat on the seat 3 of the felloe band. 11 designates a plate which is also secured by the rivets 16 to the underside of the ring 8 and forming a unit with the ring 8 and rim 7. This plate 11 (there being a number of plates disposed around the circumference of the rim) includes a side wall 12 merging with a seat 13 to cooperate with the seat 5 of the felloe band. It also has an apertured lug or securing portion 14, the aperture 15 of which is designed to receive the securing bolts 6 which hold the filler rim and the rim proper 7 in position on the felloe band of the wheel.

The depth of the side wall 9 and the depth of the walls 12 of the several plates 11 is such as to occupy completely, as it were, the space between the rim proper 7 and the felloe band and afford a secure connection between the rim 7 and the felloe band of the wheel 17. The wheel 17 may, of course, be of any ordinary construction, and the felloe band and wheel per se constitute no part of my present invention.

What I claim is:

In means for the conversion of a pneumatic-tired wheel of standard make having a fixed rim formed of an annular band and side walls having rim seats at their edges formed to receive a pneumatic-tire with its demountable rim, into a cushion-tired wheel; the combination with the fixed rim of an adapter comprising a continuous side wall, an annular band and a seat flange, the latter adapted to seat on one of the rim seats of the fixed rim, a cushion-tire rim secured to said annular band, and a series of plates secured beneath the annular band to the same, each of said plates having outer wall portions provided with seats to rest on the other rim seat of the fixed rim and having an apertured ear to receive a rim bolt, said fixed rim having a rim bolt for the purpose specified.

WALLACE R. GILLAM.